Sept. 20, 1955

S. BIRK 2,718,573

MEANS FOR SIMULTANEOUSLY CONTROLLING A
MULTIPLICITY OF THERMOSTATIC HEAT AND
PRESSURE CONTROL UNITS

Filed Sept. 15, 1953

INVENTOR
SOL BIRK,
BY
Irving Seidman
ATTORNEY

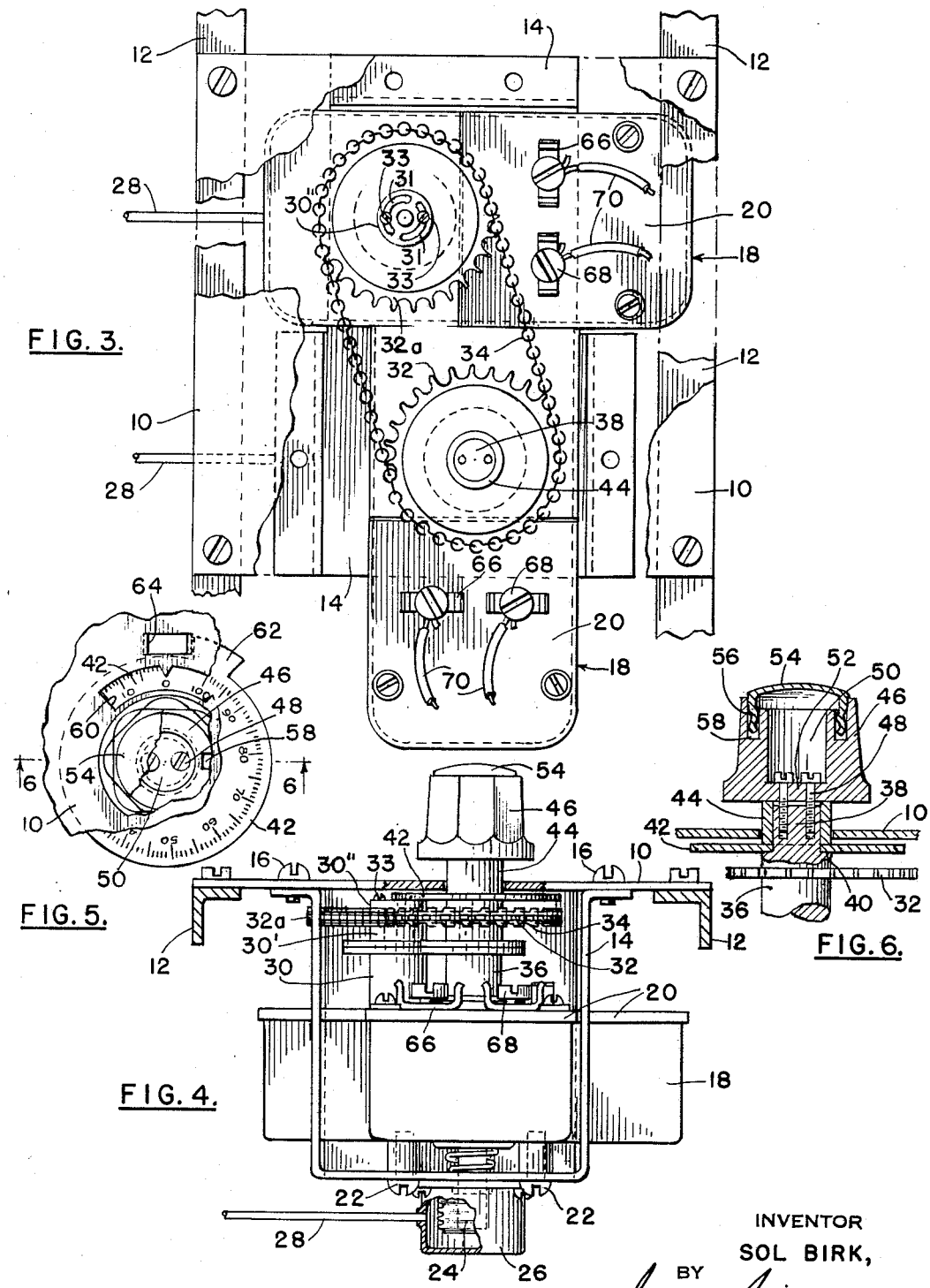

Sept. 20, 1955                 S. BIRK                 2,718,573
MEANS FOR SIMULTANEOUSLY CONTROLLING A
MULTIPLICITY OF THERMOSTATIC HEAT AND
PRESSURE CONTROL UNITS
Filed Sept. 15, 1953                                            4 Sheets-Sheet 3

INVENTOR
SOL BIRK,
BY
Irving Seidman
ATTORNEY

Sept. 20, 1955      S. BIRK      2,718,573
MEANS FOR SIMULTANEOUSLY CONTROLLING A
MULTIPLICITY OF THERMOSTATIC HEAT AND
PRESSURE CONTROL UNITS
Filed Sept. 15, 1953      4 Sheets-Sheet 4
FIG. 9.
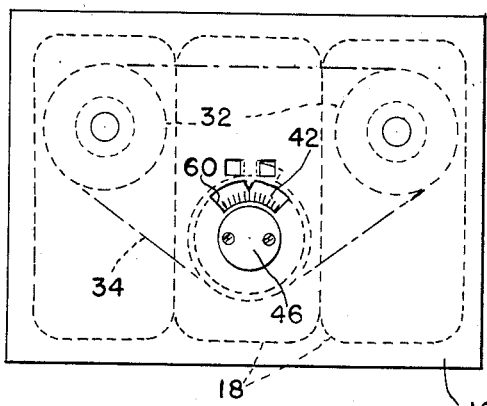
FIG. 10.
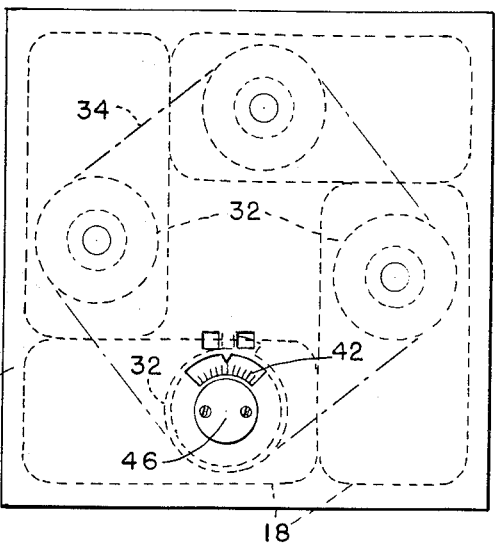
FIG. 11.
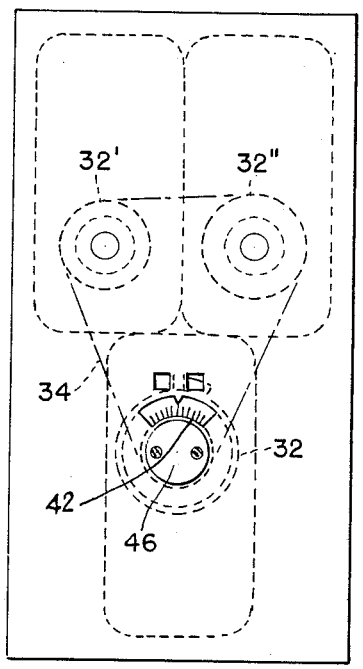
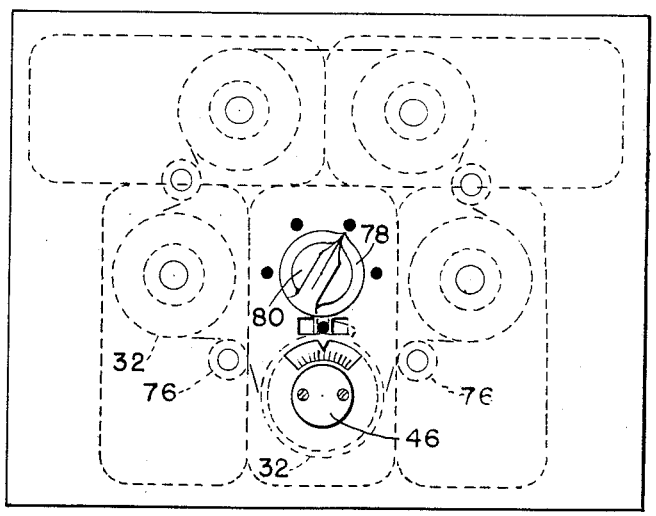
FIG. 12.
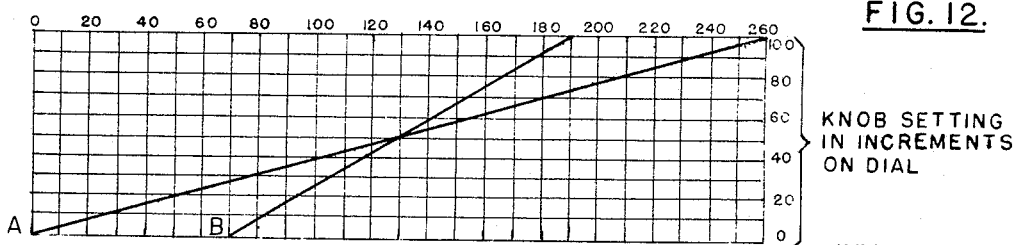
KNOB SETTING
IN INCREMENTS
ON DIAL
FIG. 13.
INVENTOR
SOL BIRK,
BY
Irving Seidman
ATTORNEY

United States Patent Office 2,718,573
Patented Sept. 20, 1955

2,718,573

MEANS FOR SIMULTANEOUSLY CONTROLLING A MULTIPLICITY OF THERMOSTATIC HEAT AND PRESSURE CONTROL UNITS

Sol Birk, Bronx, N. Y.

Application September 15, 1953, Serial No. 380,290

14 Claims. (Cl. 200—140)

This invention relates to a thermostatic heat and pressure controlling assembly and has particular reference to a device of the character set forth wherein a multiplicity of thermostatic control units are combined and controlled by a single knob and indicating dial, each thermostatic unit comprising an electrical switch element controlled by an expansible vapor unit.

A primary object of this invention resides in the provision of an assembly as above described wherein a single thermostatic unit is provided with a dial and knob and is connected, by means of gears or sprockets and chain, to a multiplicity of thermostatic units in the assembly. The single knob and dial functioning as a master setting means and, through its connection with numerous thermostatic units is adapted to simultaneously set a multiplicity of same.

A further object of this invention is the inclusion therein of expansible bellows vapor units and connected bulbs and capillaries which are adapted to connect the multiple thermostatic units to numerous independent units for heating same to any predetermined temperature and maintaining the combined or independent temperature through the heating process.

Another object of this invention contemplates the provision of an assembly of the character described wherein the various electrical circuits between the units being heated and their corresponding thermo-switches in each control unit, may be wired to a single control which is adapted to set and control the operation of multiple thermostatic switch units.

Still another object of this invention is to provide an assembly wherein the relationship between two or more heater circuits may be maintained with respect to temperature control, at a definite and constant spaced distance, in degrees of temperature.

Still another object of this invention is the provision of a temperature control assembly wherein the various temperature spacings may be maintained constantly throughout the whole range or at any intermittent points of the combined multiple thermostats, depending upon the initial setting with relation to each other.

A further object of the present invention is the provision of a control assembly wherein the location of the vapor filled sensing bulb or the ratio between the sprockets or gears will close or open two or more multiple circuits thereby controlling temperatures at a varying range or location but at a close relationship between each other depending upon the ratio of the sprockets or gears or location of sensing bulbs involved.

A further object of this invention is the provision of an assembly unit of the type set forth which may be employed for processing equipment for closing or opening electric switches in such auxiliary devices as relays, meters, alarms or other equipment which will become active at any predetermined degree of temperature, using, for instance, a single pole double throw in combination with a double pole-double throw switch or any other combination of circuits or contact arrangement to close or open different circuits at a desired and predetermined sequence with respect to temperature and/or pressure control.

Yet another object of this invention resides in the provision of thermostatic heat controlling means of the type set forth which will maintain a constant and sensitive temperature at low ranges by decreasing the number of separate heating circuits and their heat volume and increasing the number of these circuits when a larger volume of heat is desired. Yet a sensitive differential between "on" and "off" of the heater can be maintained and temperature overshoot reduced to a minimum.

A still further object of this invention is the inclusion therein of a selector switch, the circuit terminals of which, are connected to the precalibrated electro-thermal units, thus allowing a single pre-calibration of temperature of the combined multiple temperatures and an instant selection therewith of any of the already calibrated units.

Briefly, the present invention comprises a multiplicity of conventional thermostatic switch units which are conjoined to form a single operating unit. Each thermostatic switch unit is of a conventional type and has a switch actuated by a bellows type expansible unit. A tube, generally known as a capillary, is connected to the bellows type expansible unit in each thermostatic switch unit and conveys an expansible vapor thereto. A larger tube, known to the trade as a bulb is connected to the capillary and terminates at a point in close proximity to an element to be heated. This combination of parts may be used in processing.

As hereinbefore stated, the thermostatic switch units are conventional and each has a rotatable stem by means of which the bellows type expansible unit may be adjusted to actuate its cooperating switch. The said rotatable stems extend upwardly through a supporting plate suitably mounted upon a carrying means and one of said stems is provided with a knob by which the stem may be rotated. All of the stems are provided with sprocket wheels which are joined by means of a link chain and all are rotated by the rotation of a single knob which will hereinafter be termed the master setting knob. The stem carrying the turning knob is further provided with a graduated dial which is secured to the stem below the supporting plate. These increments upon the dial become visible through a window in the supporting plate. Obviously, the rotation of the master knob will simultaneously rotate all of the connected stems upon the assembled thermostatic switch units and are thus set to control the heat in various elements to be heated, at a predetermined heat.

With the set up as above described, the heat in numerous units which are to carry a predetermined and varying degree of heat may be controlled and regulated by the manipulation of the master setting knob upon a single thermostatic switch unit. There are numerous ramifications in the use of this device which will be hereinafter explained. Certain arrangements of the assembly may be made whereby pressure and temperature may be controlled in combination or as a safety cut out at high or low points of the range in a desired combination.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

The invention itself, however, both as to its organization and its method of operation, will best be understood from the following description of a specific embodiment when read in connection with the accompanying drawing, in which:

Fig. 3 is a plan view similar to Fig. 1, but has the top or carrying plate partly broken away.

Fig. 4 is an end elevation looking in the direction indicated by the arrow Y of Fig. 1, and has parts broken away.

Fig. 5 is an enlarged fragmentary detail of an operating knob and attached dial.

Fig. 6 is a sectional, elevational view taken in a plane along line 6—6 of Fig. 5.

Fig. 9 is a diagrammatic plan view showing an assembly of three thermostatic switch units wherein the sprockets of same are all of equal diameter.

Fig. 10 is a diagrammatic plan view of an assembly comprising four thermostatic switch units having similar sprocket wheels.

Fig. 11 is a diagram showing three thermostatic switch units but with sprockets of differing diameters.

Figure 1:
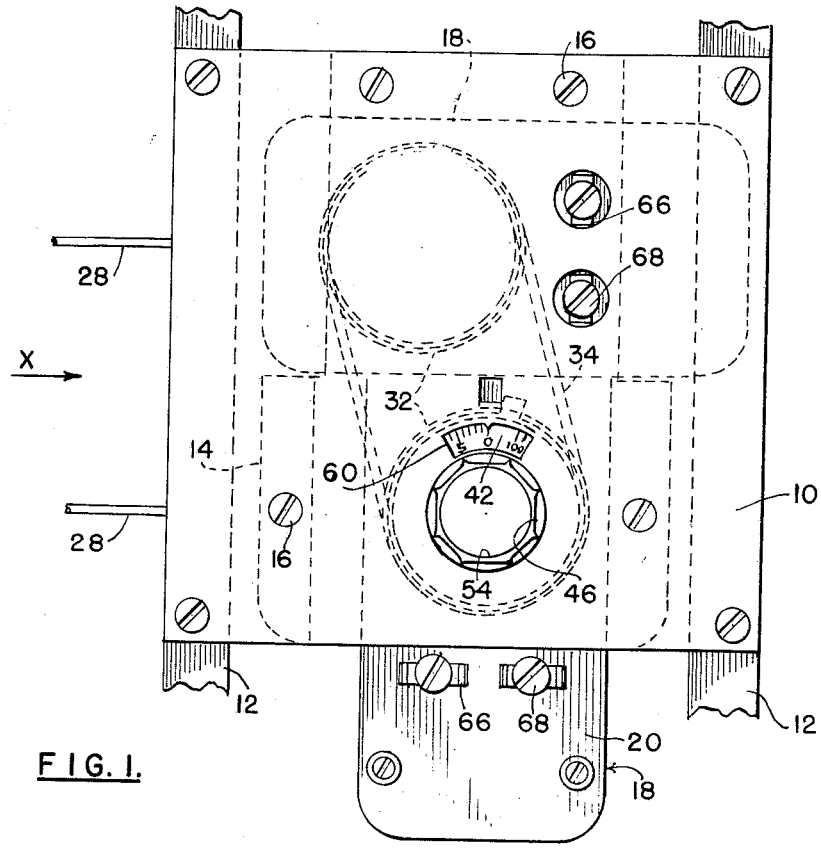
Fig. 1 is a top or plan view which shows a method of combining two conventional thermostatic switch units.
Figure 2:
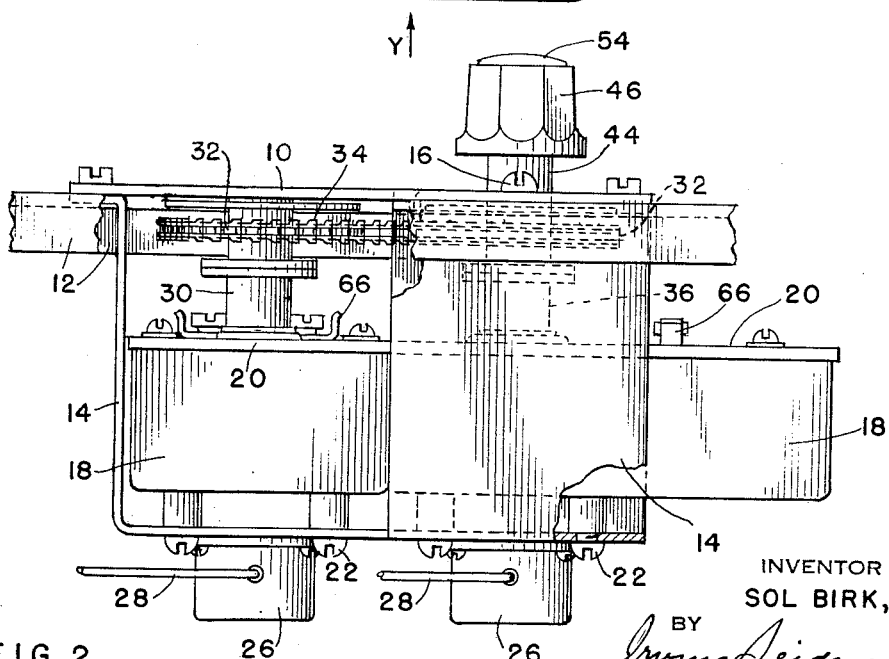
Fig. 2 is a side elevational view of same looking in the direction indicated by the arrow X of Fig. 1.

Fig. 12 is a diagram showing five thermostatic switch units and shows a series of idler sprocket wheels adapted to give the link chain a positive grip around the larger sprocket wheels and also shows the inclusion of a selector switch to pick out individual circuits to thermostatic switches as will be hereinafter explained, and Fig. 13 is a graph showing the temperature ratings between two heated elements with respect to the increments upon a graduated dial.

Referring to the drawings wherein similar reference numerals refer to similar parts, and to Figs. 1 to 4 inclusive, 10 designates a top or supporting plate which is carried upon cross bars 12 in turn suitably supported upon a frame or table (not shown). A depending bracket 14 is secured to the supporting cover plate 10 by means of screws 16. Conventional thermostatic switch housings 18 having a top plate 20 of suitable insulating material are secured to the bracket 14 by means of screws 22. Each thermostatic housing 18 includes therein a regulation switch element (not shown) which is adapted to make or break an electric circuit by the action of a cooperating conventional bellows type expanding or contracting unit 24 within a housing 26 (Fig. 4). A tube 28, known to the trade as a capillary directs an expansible vapor to the housing 26. A second tube, of larger diameter sealed at its outer end and known as the bulb, is connected at its opposite end with the capillary, and extends to the unit to be heated.

All conventional thermostatic swtich units, excepting a single master control unit, are provided with a stem 30, by the rotation of which the bellows type expansion unit 24 may be adjusted. To the upper portion of the stems 30 and master stem 36 there are secured sprocket wheels 32a and 32' respectively which are connected by an endless link chain 34. The master stem 36 is formed with a contracted extension 38 (Fig. 6) which extends upwardly through the supporting plate 10. A ledge or shoulder 40 provides support for a dial 42 which is held in place by a collar 44 in turn tightly held against rotation by means of a turning knob 46. Screws 48 hold the knob 46 in place and by pressure upon the collar 44 secure the dial 42 upon the master stem 36. The knob 46 is formed with a hollowed portion 50 and a bottom portion 52 through which the screws 48 engage. A cap or dome 54 having depending spring lugs 56 forms a cover for the hollowed portion 50 and the spring lugs 56 engage in sockets 58 to hold the cap in place. The dial 42 is marked with graduations and increments designating degrees of heat to which the thermostatic switches may be set. The increments upon the dial 42 may be observed through an orifice 60 cut out of the supporting plate 10 (Fig. 5). The dial 42 is formed with a lug 62 which projects radially from the circumference of the dial and engages with depending lugs 64 pressed out of the top plate 10 to form a stop means to limit the rotation of the dial in either direction.

Terminal members comprising lugs 66 and screws 68 are provided upon the insulating plate 20 and afford a means for attaching the ends of electric current lines 70 which lead from a current supply line to the unit to be heated (not shown). One of the terminal members has electrical connections, within the housing 18 to a switch arm while the second terminal member connects with a contact point, all within the housing and not shown. All of the electrical connections are conventional.

Figure 7:
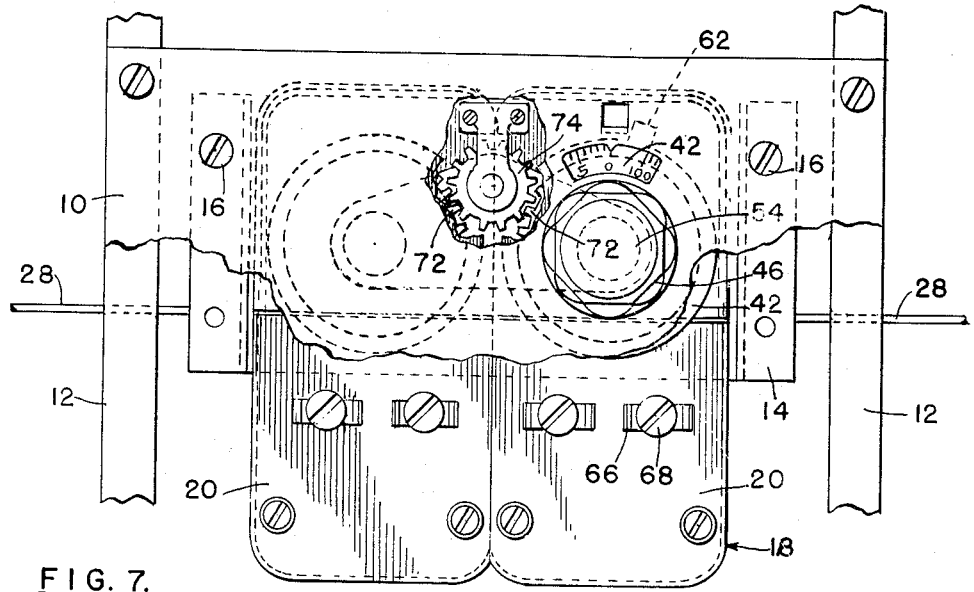
Fig. 7 is a plan view of a two unit thermostatic switch assembly and shows a slight modification which will be hereinafter fully described, and also shows the greater portion of the cover and supporting plate broken away.
Figure 8:
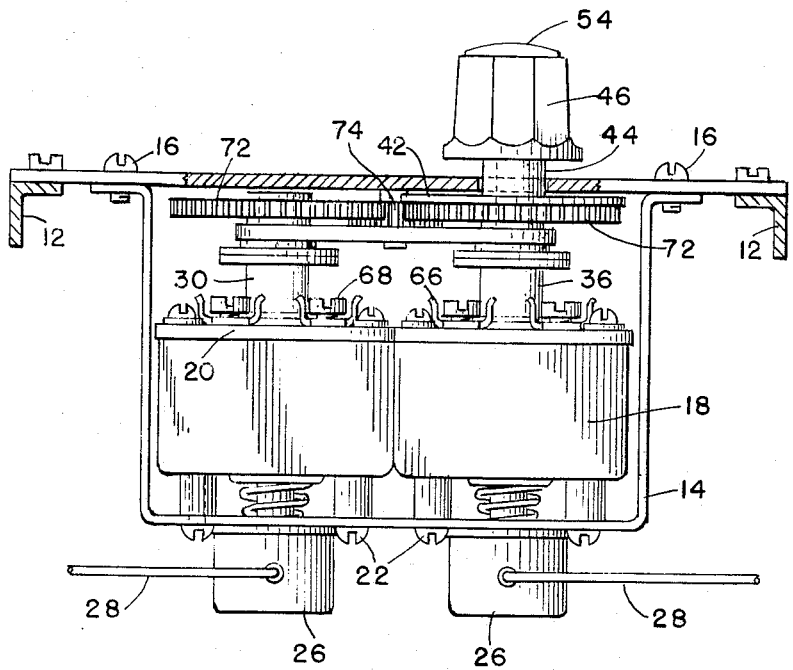
Fig. 8 is a front elevational view of Fig. 7.

Figs. 7 and 8 show a modified application of the present invention. In this form, in lieu of the link chain and sprockets there is provided a chain of gears comprising the gears 72 and an intermediate spur gear 74.

Fig. 9 shows an assembly comprising three thermostatic switch units 18 wherein the sprockets 32 and chain 34 are activated by the master knob 46. In this form all sprocket wheels are of the same diameter.

Fig. 10 shows an arrangement of an assembly comprising four thermostatic switch units also controlled by the master knob and dial 46 and 42.

Fig. 11 shows an assembly of three thermostatic switch units but with sprockets of differing diameters as 32' and 32" but controlled by a master knob and dial 46 and 42.

Fig. 12 shows an assembly of five thermostatic switch units with all sprockets of the same size but including idler gears 76 which are employed to provide a substantial engagement of the link chain around all sprocket wheels. This embodiment shows, in addition, a selector switch 78 and knob 80. The terminal points in the switch 80 are all connected in series with the leads to the switch in each unit and by rotating the knob 80 may individually cut in any one of the thermostat switches leaving open the circuits to the remaining switches in the assembly.

The multiple thermostat of the present invention is a combination of separate and individual units each with its respective load and current rating and by its use a multiple number of loads can be arranged in combination and governed by a single or master knob adjustment. With the assembly unit of the present invention a sensitive and constant temperature differential can be achieved by increasing or decreasing the number of separate heater circuits with respect to any high or low temperature that may be desired. This is achieved by setting the individual thermostats so that on higher temperatures more heater circuits are closed and energized while on lower temperatures these heater circuits are opened and become de-energized leaving only the desired heater circuits to operate and supply the exact amount of heat desired, without overshooting or creeping.

The assembly as set forth may also act as a safety device to take over the controlling functions of the next higher or lower thermostat setting if one fails to operate.

The assembly as set forth may also by opening the end of the respective sensing bulbs and connecting them to hermetically sealed vessels under pressure, and with the features described in the preceding paragraphs with respect to controlling temperatures, be employed to control the pressures of the respective vessels.

In the graph shown in Fig. 13, the vertical lines indicate degrees of temperature and the horizontal lines are numbered to indicate the increments upon the dial heretofore mentioned. A designates one heating cycle and B designates a second heating cycle with a ratio difference of 70° at their low and high points. When a master dial is set to the 70 upon the said dial, the unit A will be brought up to the temperature of 180° while the unit B will go up to the temperature of 155°. If the dial is set at 50 the temperature of both units will rise to 130°. In a similar manner the relative degrees of temperature can be read with respect to the increment markings upon the master dial.

Referring now to Figs. 3 and 4, the stem 30, shown in Fig. 4, has secured thereto an upstanding portion 30' to the upper end of which the sprocket 32a is secured. This sprocket 32a is formed with an upstanding boss 32" in which a pair of arcuate slots 31 are formed and which extend through the gear 32' (Fig. 3). Screws 33 extend through the slots and engage threaded bores (not shown) in the boss 32". By loosening the screws 33 the gear 30" may be rotated for adjustment.

The diagram (Fig. 13), indicates the ratio in degrees of temperature relative to dial and master knob and adjustment may be attained by varying the ratio between sprockets or gears between control units of the assembly.

I claim:

1. The combination with a multiplicity of thermostatic heat and pressure controlling units comprising switches actuated by bellows type expansible vapor units and spindles extending upwardly from the thermostatic units adapted, by rotation, to set the expansible vapor units for controlling temperatures to heating units, of master and auxiliary sprocket wheels upon the spindles of the multiple thermostatic control units, an endless link chain embracing the sprocket wheels, an upwardly extending contracted extension to the spindle of one thermostatic switch unit, a graduated dial secured to the contracted extension of the spindle and a knob secured to the end of the contracted extension of the spindle, providing a means for rotating the sprockets upon a multiplicity of spindles for simultaneously setting the bellows type expansible vapor units upon the multiple thermostatic switch units.

2. The combination with a multiplicity of thermostatic heat and pressure controlling units as set forth in claim 1, wherein the graduated dial may be rotated and securely set upon the contracted spindle extension for properly fixing the rotation of the spindles.

3. The combination with a multiplicity of thermostatic heat and pressure controlling units as set forth in claim 1, including idler gears to tighten the link chain around the sprocket wheels of the multiple thermostatic units.

4. The combination with a multiplicity of thermostatic heat and pressure controlling units as set forth in claim 1, including a selector switch electrically connected to each thermostatic unit for selecting one of the multiple thermostatic units.

5. The combination with a multiplicity of thermostatic heat and pressure controlling units as set forth in claim 1, wherein the ratio of said master and auxiliary sprocket wheels will close or open two or more multiple circuits controlling temperatures at a varying range.

6. The combination with a multiplicity of thermostatic heat and pressure controlling units as set forth in claim 1, wherein said thermostatic heat controlling means will maintain a constant and sensitive temperature at low ranges by decreasing the number of separate heating circuits and their heat volumes and increasing the number of these circuits when a larger volume of heat is desired, yet a sensitive differential between "on" and "off" is maintained and temperature overshoot reduced to a minimum.

7. The combination with a multiplicity of thermostatic heat and pressure controlling units as set forth in claim 1, wherein the graduated dial may be rotated and securely set upon the contracted spindle extension for properly fixing the rotation of the spindles.

8. The combination with a multiplicity of thermostatic heat and pressure controlling units as set forth in claim 1 including a selector switch electrically connected to each thermostatic unit for selecting one of the multiple thermostatic units.

9. The combination with a multiplicity of thermostatic heat and pressure controlling units as set forth in claim 1, wherein the said auxiliary sprockets are provided with means for rotatably adjusting same upon its attached stem.

10. The combination with a multiplicity of thermostatic heat and pressure controlling units as set forth in claim 1, wherein the said auxiliary sprockets are provided with means for rotatably adjusting same upon its attached stem.

11. The combination with a multiplicity of thermostatic heat and pressure controlling units as set forth in claim 1, wherein said thermostatic heat controlling means will maintain a constant and sensitive temperature at low ranges by decreasing the number of separate heating circuits and their heat volumes and increasing the number of these circuits when a larger volume of heat is desired, yet a sensitive differential between "on" and "off" is maintained and temperature overshoot reduced to a minimum.

12. The combination with a multiplicity of pressure controlling units comprising switches actuated by bellows type expansible units and spindles extending upwardly from the said units adapted, by rotation, to set said expansible units for controlling pressure, to master and auxiliary sprocket wheels upon said spindles of the multiple pressure units, and endless link chain embracing said sprocket wheels, and upwardly extending contracted extension to said spindles of one pressure switch unit, a graduated dial secured to the contracted extension of said spindle and a knob secured to the end of the contracted extension of said spindle, providing a means for rotating said sprockets upon a multiplicity of spindles for simultaneously setting said bellows type expansible pressure units upon the multiple pressure switch.

13. The combination with a multiplicity of pressure controlling units comprising switches actuated by bellows type expansible pressure units and spindles extending upwardly from said pressure units adapted, by rotation, to set said expansible pressure units for controlling pressures of gears upon said spindles of said multiple pressure units, idler gears disposed between and in engagement with the gear upon each spindle, an upwardly extending contracted extension to said spindle of one pressure switch unit, a graduated dial secured to the contracted extension of said spindle and a knob secured to the end of the contracted extension of the spindle, providing a means for rotating the connected gears and idlers and rotating the multiple spindles for simultaneously setting the bellows type expansible pressure units upon the multiple pressure switch units.

14. The combination with a multiplicity of thermostatic heat and pressure controlling units as set forth in claim 1, wherein by varying the ratio of said gears upon the spindles thereby closing or spacing, at a definite ratio to, or moving multiple circuits controlling temperature of pressure at a varying ratio and range by varying the space between the thermostat contact points and by means of a single adjusting knob.

References Cited in the file of this patent

UNITED STATES PATENTS

| | | |
|---|---|---|
| 1,667,056 | Smith | Apr. 24, 1928 |
| 2,032,037 | Auth | Feb. 25, 1936 |
| 2,506,623 | Williams | May 9, 1950 |
| 2,661,401 | Jochem et al. | Dec. 1, 1953 |